United States Patent
Brown (10) Patent No.: US 10,355,859 B2
(45) Date of Patent: Jul. 16, 2019

(54) METHOD AND SYSTEM FOR SELECTING A SECURE PRIME FOR FINITE FIELD DIFFIE-HELLMAN

(71) Applicant: Certicom Corp., Mississauga (CA)

(72) Inventor: Daniel Richard Brown, Mississauga (CA)

(73) Assignee: Certicom Corp., Mississauga (CA)

( * ) Notice: Subject to any disclaimer, the term of this patent is extended or adjusted under 35 U.S.C. 154(b) by 145 days.

(21) Appl. No.: 15/470,259

(22) Filed: Mar. 27, 2017

(65) Prior Publication Data
US 2018/0278416 A1   Sep. 27, 2018

(51) Int. Cl.
*G06F 7/00* (2006.01)
*H04L 9/08* (2006.01)
*H04L 9/30* (2006.01)

(52) U.S. Cl.
CPC .............. *H04L 9/0861* (2013.01); *G06F 7/00* (2013.01); *H04L 9/0841* (2013.01); *H04L 9/3013* (2013.01); *H04L 9/3033* (2013.01)

(58) Field of Classification Search
CPC ....... H04L 9/0861; H04L 9/14; H04L 63/061; H04L 9/3013
USPC .......................................................... 380/47
See application file for complete search history.

(56) References Cited

U.S. PATENT DOCUMENTS

| | | | | |
|---|---|---|---|---|
| 6,483,921 B1* | 11/2002 | Harkins | ................ | H04L 9/0841 380/286 |
| 8,464,060 B2 | 6/2013 | Yao et al. | | |
| 8,949,601 B2* | 2/2015 | Schmid | ................ | G06Q 10/107 713/168 |
| 2017/0237770 A1* | 8/2017 | Meriac | ................ | H04L 63/0876 726/23 |

(Continued)

OTHER PUBLICATIONS

Joshua Fried, Pierrick Gaudry, Nadia Heninger, Emmanuel Thomé, "A kilobit Hidden SNFS Discrete Logarithm Computation", http://ia.cr/2016/961, 2016.

(Continued)

*Primary Examiner* — Harunur Rashid
*Assistant Examiner* — Angela R Holmes
(74) *Attorney, Agent, or Firm* — Moffat & Co (57) ABSTRACT

A method for a Diffie Hellman key exchange, the method including selecting a field size p in the form p=hq+1, where q is a prime number that is one plus a factorial number b, such that q=(b!+1), and h is a cofactor, such that p=hq+1 is prime; selecting a generator integer g whose order modulo p is the prime q or is divisible by q; choosing a private key x; computing a public key $g^x$ mod p by raising said generator g to the power of said private key x, using arithmetic modulo said prime field size p; sending said public key $g^x$ mod p to a correspondent; receiving, from the correspondent, a second public key B comprising g raised to a second private key y selected by the correspondent, in the form $g^y$; and creating a key $B^x$ from the received second public key B, by raising said second public key B to the power of said private key x, using arithmetic modulo said prime field size p.

15 Claims, 4 Drawing Sheets

(56) References Cited

U.S. PATENT DOCUMENTS

2018/0091301 A1* 3/2018 Nunez .................. G06F 21/606

OTHER PUBLICATIONS

Daniel M. Gordon, "Designing and Detecting Trapdoors for Discrete Log Cryptosystems", Crypto '88, Lecture Notes in Computer Science vol. 740, pp. 66-75, 1992.
Bert Den Boer, "Diffie-Hellman is as Strong as Discrete Log for Certain Primes", Crypto '88, Lecture Notes in Computer Science vol. 403, pp. 530-539, 1988.
Transport Layer Security (TLS) Working Group of the Internet Engineering Task Force (IETF), D. Gillmor, RFC 7919, "Negotiated Finite Field Diffie-Hellman Ephemeral Parameters for Transport Layer Security (TLS)", https://tools.ietf.org/html/rfc7919, 2016.
IP Security Protocol (IPSEC) Working Group of the Internet Enginerring Task Force (IETF), RFC 3526, T. Kivinen, M. Kojo, More Modular Exponential (MODP) Diffie-Hellman Groups for Internet Key Exchange (IKE), https://ietf.org/rfc/rfc3526.txt, 2003.
Kejariwal, "Cryptic Primes", IEEE Potentials, Mar. 2004.
Allen et al., "Diffie-Hellman mod 630(427!+1)+1", CFRG, Prague, Jul. 18, 2017.
International Search Authority, International Search Report for International Application No. PCT/CA2018/050313, dated Mar. 15, 2018.

* cited by examiner

METHOD AND SYSTEM FOR SELECTING A SECURE PRIME FOR FINITE FIELD DIFFIE-HELLMAN

FIELD OF THE DISCLOSURE

The present disclosure relates to selection of finite field sizes in the field of cryptography.

BACKGROUND

The Diffie-Hellman key exchange is a method of securely exchanging cryptographic keys over a public channel. In various systems, the protocol uses a multiplicative group of integers modulo p, where p is a prime. A public value g is a primitive root of modulo p and is raised to an exponent that is secret on each side of the cryptographic transaction. Due to the features of multiplicative groups, the exchange of two primitive roots, each raised to a secret for one of the parties, can be combined together to form a shared secret between the two parties. Due to the discrete logarithm problem, an eavesdropper is unable to easily derive the shared secret.

In 1992, Daniel M. Gordon published a paper entitled "*Designing and detecting trapdoors for discrete log cryptosystems*", CRYPTO '92, Lecture Notes in Computer Science vo. 740, pp. 66-75. In the paper, Gordon realized that special primes are vulnerable to the special number field sieve, meaning that the primes are not as secure as believed. Further, Gordon realized that such special primes could have their special structure fairly well hidden. Thus, an attacker can use this backdoor to find other parties' secret agreed key after observing the public messages exchanged during any Diffie-Hellman key agreement session.

Further, security risks associated with a selected field size p may include other vulnerabilities, in addition to Gordon's attack. These may include, for example: potential vulnerability to the special number field sieve, either hidden as in Gordon's attacks, or open; potential vulnerability to other secret algorithms against the discrete logarithm problem that may only affect a random Diffie-Hellman field size with small probability; potential vulnerability of a weak Diffie-Hellman problem, even if the discrete logarithm problem remains hard; a threat of small subgroup attacks; and non-optimal efficiency of arithmetic among Diffie-Hellman moduli of comparable security. While some methods attempt to reduce some of the potential vulnerabilities above, no current methods address all of the above potential vulnerabilities.

BRIEF DESCRIPTION OF THE DRAWINGS

The present disclosure will be better understood with reference to the drawings, in which.

DETAILED DESCRIPTION OF THE DRAWINGS

The present disclosure provides a method for a Diffie Hellman key exchange, the method comprising: selecting a field size p in the form $p=hq+1$, where q is a prime that is one plus a factorial number b, such that $q=(b!+1)$, and h is a cofactor, such that $p=hq+1$ is prime; selecting a generator integer g whose order modulo p is the prime q or is divisible by q; choosing a private key x; computing a public key $g^x$ mod p by raising said generator g to the power of said private key x, using arithmetic modulo said prime field size p; sending said public key $g^x$ mod p to a correspondent; receiving, from the correspondent, a second public key B comprising g raised to a second private key y selected by the correspondent, in the form $g^y$; and creating a key $B^x$ from the received second public key B, by raising said second public key B to the power of said private key x, using arithmetic modulo said prime field size p.

The present disclosure further provides a computing device configured for a Diffie Hellman key exchange, the computing device comprising a processor configured to: select a field size p in the form $p=hq+1$, where q is a prime that is one plus a factorial number b, such that $q=(b!+1)$, and h is a cofactor, such that $p=hq+1$ is prime; select a generator integer g whose order modulo p is the prime q or is divisible by q; choose a private key x; compute a public key $g^x$ mod p by raising said generator g to the power of said private key x, using arithmetic modulo said prime field size p; send said public key $g^x$ mod p to a correspondent; receive, from the correspondent, a second public key B comprising g raised to a second private key y selected by the correspondent, in the form $g^y$; and create a key $B^x$ from the received second public key B, by raising said second public key B to the power of said private key x, using arithmetic modulo said prime field size p.

The present disclosure further provides a computer readable medium comprising program code, that when executed by a processor of a computing device is configured for a Diffie Hellman key exchange, the program code causing the computing device to: select a field size p in the form $p=hq+1$, where q is a prime that is one plus a factorial number b, such that $q=(b!+1)$, and h is a cofactor, such that $p=hq+1$ is prime select a generator integer g whose order modulo p is the prime q or is divisible by q; choose a private key x; compute a public key $g^x$ mod p by raising said generator g to the power of said private key x, using arithmetic modulo said prime field size p; send said public key $g^x$ mod p to a correspondent; receive, from the correspondent, a second public key B comprising g raised to a second private key y selected by the correspondent, in the form $g^y$; and create a key $B^x$ from the received second public key B, by raising said second public key B to the power of said private key x, using arithmetic modulo said prime field size p.

Figure 1:
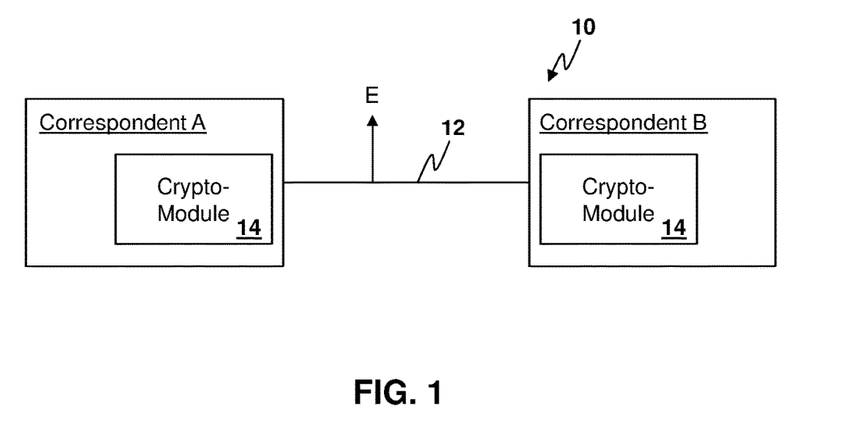
FIG. 1 is a block diagram showing participants exchanging information utilizing cryptographic modules.

Reference is now made to FIG. 1, which show a system 10 for message communication between a pair of correspondents. Specifically, in FIG. 1, a pair of correspondents A and B are connected by a data communication link 12. Each of correspondents A and B has a cryptographic module or unit 14 which performs public key cryptography operations according to established protocols to permit secure communication over link 12. The cryptographic units 14 operate within a cryptographic domain whose parameters are shared by other entities.

In one example, correspondents A and B utilize a Diffie-Hellman (DH) key exchange. Specifically, a Diffie-Hellman key exchange uses a commutative group, which is a type of algebraic system with one binary operation and obeying certain axioms.

The group originally proposed by Diffie and Hellman is known as the multiplicative group of the finite field of size p, where p is a prime number. Using such multiplicative group, the set of numbers {1, 2, ..., p−1}, may have a binary operation defined to be multiplication modulo p, which means multiplication after computing the remainder upon division by p. This group is well-known in mathematics and was applied to cryptography by Diffie and Hellman.

For illustration purposes, consider a small prime p=5. The binary operation, multiplication modulo p for the group can be represented in the following table:

TABLE 1

Binary operation, multiplication modulo 5

| x | 1 | 2 | 3 | 4 |
|---|---|---|---|---|
| 1 | 1 | 2 | 3 | 4 |
| 2 | 2 | 4 | 1 | 3 |
| 3 | 3 | 1 | 4 | 2 |
| 4 | 4 | 3 | 2 | 1 |

In this group, we have for example 2×4=3. Specifically, a normal multiplication 2×4=8, but in this group, the remainder is computed modulo 5 which gives 3 since 8=1×5+3.

For any element g of a group, and some positive integral number x, we can define $g^x$ by applying the binary operation between x copies of g. This operation is called group exponentiation, and g is called the base and x the exponent. In the case where the group is the multiplicative group of a finite field, group exponentiation is also called modular exponentiation.

Thus, for illustration, let p=5 as in Table 1 above. If g=2 and x=6, then in modular exponentiation, $g^x=2^6=4$. This is because, under conventional exponentiation, $2^6=64$ and the remainder of 64 modulo 5 is 4.

Group exponentiation can be done quite efficiently, even, for example, in a large group of size nearly $2^{256}$, using algorithms such as the square-and-multiply algorithm. This algorithm requires at most 2 $\log_2$ (x) group operations to compute $g^x$. In a group size $2^{256}$, a group exponentiation takes 512 group operations or less, which is typically practical.

A discrete logarithm is the inverse of group exponentiation. The discrete logarithm of $y=g^x$ to the base g is x. Computing the discrete logarithm is a "hard" problem in some groups. The hardness of this problem is central to the security of Diffie-Hellman key exchange and related public-key cryptography algorithms, called the discrete logarithm problem (DLP). Hard is a term of art in cryptography and as used herein generally means beyond the reach of an adversary that must be prevented from breaking the system as long as the security of the system is deemed important. Mathematically, the term may mean that the solution to the problem is unsolvable in asymptotic polynomial time.

Thus, public key cryptography relies on the DLP being hard.

Referring again to FIG. 1, in the Diffie-Hellman key exchange, contributor A generates a secret exponent x, and contributor B generates a secret exponent y. The secret exponents x and y may be referred to as the private keys for contributors A and B respectively.

A sends $A=g^x$ to B, and B sends $B=g^y$ to A. Contributor A computes $z=B^x$ and contributor B computes $w=A^y$. The computed values are equal since $z=g^{xy}=w$, so both contributors have computed the same shared value w=z.

For groups in which the discrete logarithm problem is hard, it is typically believed that it is hard for an adversary or eavesdropper E to compute z and w from g, A, and B. The problem is now known as the Diffie-Hellman problem (DHP). The DHP can be solved by solving the DLP: given $A=g^x$, find x by solving the DLP, and then compute $B^x$, by group exponentiation, thereby solving the DHP, since $w=z=B^x$. Therefore, the DHP is no harder than the DLP. The DHP might be easier than the DLP, but in some cases, one can solve the DLP by solving the DHP, although the conversion may take more steps.

The above is the basic general form of the Diffie-Hellman key exchange.

Subsequent to the Diffie-Hellman key exchange being described, ElGamal introduced a method of using the same Diffie-Hellman groups for digital signatures, which allow contributors A and B to be sure of each other's messages. ElGamal also clarified the Diffie-Hellman key exchange could be used to build public-key encryption schemes. In one example, contributor B can use a fixed Diffie-Hellman private key, while contributor A can use an ephemeral private key which has only one key per message it wishes to send to contributor B.

Diffie-Hellman Field Size

From the above, a known integer g is raised to x and y respectively for the key exchange. The integer g has an order q modulo p, meaning that $g^q \equiv 1$ mod p, where q is the smallest such positive integer.

The hardness of the DHP described above is affected by the field size p chosen. Specifically, several vulnerabilities have been found relating to the value of p.

Den Boer's Reduction

One theorem states that q divides p−1, and thus it is usually good practice to choose g such that q is prime and large. Specifically, a researcher Bert den Boer published a paper in 1988 entitled "Diffie-Hellman is as strong as discrete log for certain primes", CRYPTO '88, Lecture Notes in Computer Science vol. 403, pp. 530-539, 1988. In the paper, den Boer identified criteria on the order q of the generator g that helps to prove that there is no gap between the discrete logarithm problem and the Diffie-Hellman problem. Both problems must be hard if Diffie-Hellman key agreement is to be secure.

The den Boer criterion is that q−1 is a product of small numbers.

A conventional Diffie-Hellman field size in which q−1 is not a product of small numbers does not rely on the den Boer criterion. Instead, a conventional Diffie-Hellman field size relies on conjecture that the Diffie-Hellman problem is hard. In other words, the conventional practice is to rely on a conjecture rather than den Boer's proof. This convention therefore weakens provable security.

Based on the above, in accordance with the present disclosure, a position is taken that the den Boer criterion improves the security of a Diffie-Hellman field size, since the security of the den Boer primes is provable.

One problem with den Boer's criterion is its incompatibility with other security methods, especially the naïve nothing up my sleeve (NUMS) method, as described below, as well as the hashed-output approach. Both the NUMS and hashed approach generate effectively a pseudorandom q. It is well-known number theory fact that random numbers are almost never the product of small numbers.

Therefore, the den Boer criterion is generally not met for pseudorandom approaches and may explain why conventional Diffie-Hellman primes typically do not meet the den Boer criterion. In other words, conventional Diffie-Hellman primes are typically chosen due to a concern about Gordon's attack rather than a concern about the gap between the Diffe-Hellman and discrete logarithm problems.

Gordon's Attack

A further security issue, as described above, is Gordon's attack. In particular, Gordon's attack uses a special number field sieve, which, for large primes p, is the fastest known logarithm to solve the discrete logarithm problem. For special primes p, those that can be expressed as output of a polynomial with small coefficients, the number field sieve can be sped up considerably. Roughly, one would have to nearly square the size or double the bit length of the prime to retain comparable resistance to the number field sieve for special primes versus general primes. Thus, systems using a special prime p in a Diffie-Hellman key exchange may be vulnerable to an attacker using the number field sieve.

Some deployed Diffie-Hellman systems use such special primes anyway, since they arguably offer better computational efficiency. However, the much weaker resistance to number field sieve cancels benefits of computational efficiency.

Gordon realized that special primes vulnerable to the special number field sieve could have their structure fairly well hidden.

The conventional countermeasure to the risk of Gordon's attack is to choose pseudorandom primes p derived from a nothing-up-my-sleeve number. This approach typically comes in two flavors.

In a first approach, the use of an irrational number, such as $\pi$, is then multiplied by a large number and the result is rounded to a nearby integer. The number may be incremented as needed until a prime is obtained.

In a second approach, a well-established pseudorandom function, such as a hash function, may be applied to a small input value to yield a prime.

The first approach relies on the hope that the special number structure of an irrational number such as $\pi$ does not render the number special. In other words, the special irrational number $\pi$ is somehow independent of the property needed for special number field sieve.

The second approach is more conservative in the sense that the pseudo-randomness of the hash function is already tested and relied upon elsewhere in the cryptographic algorithm. It would be surprising that the number field sieve would be able to distinguish the output of a hash function from a random string.

Both methods yield a special class of primes, but even this class of primes can be manipulated. One concern is that an adversary choosing the prime p has some leeway in the choice of the irrational number or hash function to such a degree as to be able to arrange for some kind of weakness in the field size p.

The approach above is called a nothing-up-my-sleeve (NUMS) number which is a rather general concept in cryptography. The NUMS approach is conjectured to result in a somewhat random field size, which is believed to thwart Gordon's attack of finding hidden vulnerability to the special number field sieve for several reasons. These include the fact that Gordon's attack involves a very large search. Such a large search is expected to result in a field size containing information beyond the attacker's control. In particular, it is believed unlikely that the attacker could also cause $\pi$ to appear in its definition.

Further, the decimal (or binary) expansion of $\pi$, although predictable, is generally believed to behave as though it were random, and thus uncorrelated to anything else (other than $\pi$). In other words, it is believed that the special structure in the Diffie-Hellman being derived from $\pi$ is completely uncorrelated to the special structure needed for the special number field sieve to be effective.

The NUMS approach may also thwart other attacks. Specifically, a secret attack algorithm on the discrete logarithm that only affects a random Diffie-Hellman field size with small probability may be thwarted for the same reasons that the NUMS approach thwarts the Gordon's attack. Further, the NUMS approach may thwart a weak Diffie-Hellman problem for similar reasons.

As will be described in more detail below, the embodiments of the present disclosure provide a variant of the NUMS approach. Instead of naïvely using $\pi$, it uses another canonical, yet simple mathematical structure. Thus, in the embodiments described below, the general benefits of NUMS still apply to the embodiments, but the following drawbacks of the naïve NUMS approach are avoided.

The main drawbacks of a naive NUMS approach, such as one based on $\pi$, include the following.

A field size derived from $\pi$ is effectively a pseudorandom field size, which can be expected to be no more computationally efficient than the average random prime field size. In other words, the use of such pseudorandom field size is not as computationally efficient as other field sizes.

In a further drawback, the field size derived from $\pi$ could instead have been derived from another constant such as e or the square root of two, and, therefore, is not objectively and measurably free from all manipulation. In other words, the field size is not optimally trustworthy.

Further, a drawback of NUMS is that the field size derived from $\pi$ is effectively a pseudorandom field size, so it cannot be expected to be more secure than the average prime field size.

Another drawback of the NUMS approach is that a field size derived from $\pi$ is not fully protected from number-theoretic attacks. Specifically, $\pi$ is quite related to questions in number theory. For example, the probability that two random positive integers have no common prime factors is $6/\pi^2$.

Small Cofactor Diffie-Hellman Primes

As indicated above, if p is a prime Diffie-Hellman field size, and g is a Diffie-Hellman generator modulo p, then g has some multiplicative order q, meaning that q is the smallest positive integer such $g^q=1$ mod p. It is a basic theorem of number theory that p=hq+1 for a positive integer h, which is usually called the cofactor. This is especially true when q is prime.

A small subgroup attack is a cryptographic method that operates in a large finite group, where an attacker attempts to compromise the method by forcing a key to be confined to an unexpectedly small subgroup of desired groups. A standard way to avoid such small subgroup attacks is to ensure that both p and q are prime and that h is small. Often, h is chosen to be 2.

A small cofactor Diffie-Hellman field size is an effective way to prevent small-subgroup attacks.

Unfortunately, choosing a small cofactor Diffie-Hellman field size is not enough to thwart other attacks. So, a method of choosing a small cofactor for a Diffie-Hellman field size is typically combined with other methods.

In accordance with the embodiments described below, a small cofactor is chosen in the present disclosure.

Close to a Power of Two Field Size

In a further approach to avoid a weak field size p, a Diffie-Hellman field size may be chosen to be close to a power of two, such as a Mersenne prime. Such choice may have some advantages. First, a field size that is close to the power of two is computationally efficient for its bit length. Further, the property that the field size is close to the power of two is relatively rare, and thus, similar to the NUMS approach above, it is unlikely to be the result from a search for a hidden attack.

One drawback however, to choosing a close to the power of two field size is that numbers are especially vulnerable to the special number field sieve. More quantitatively, to be equally secure against the general number field sieve for a general random prime, the bit length must be approximately doubled. This doubling in the bit length generally overwhelms the computational efficiency advantage. In other words, the field size is less efficient computationally for the level of security provided.

If a random field size and a special close to a power of two field size are chosen with approximately equal resistance to all known discrete logarithm attacks, including the general and special number field sieves, then the close to a power of two field size will be computationally slower, since it nearly has twice the bit length.

Hashed-Output Primes

Stronger security may be achieved when deriving the Diffie-Hellman field size from the output of a pseudorandom function rather than directly deriving from a constant such as $\pi$.

The reason the field size may be stronger when a pseudorandom function is used is based on the notion that $\pi$ is not actually random, or even pseudorandom. Rather, it is very special number and therefore could potentially be related to some very special secret attack.

One security argument states that deriving a Diffie-Hellman field size from $\pi$ results in the number-theoretical attack being correlated to $\pi$ is unlikely. However, this argument has little rigor.

By contrast, the output of a hash function (used as a pseudorandom function), when given a secret input, is believed to be indistinguishable from random. This belief has been tested through the use of a hash function over many years in many cryptographic systems, for tasks such as pseudorandom number generation, key derivation, and secure message authentication.

Further, most hash functions are designed using slightly arbitrary and primitive computer word operations, which are rather unlike the special-purpose mathematical operations required for Diffie-Hellman key agreement.

By contrast, the number $\pi$ is a natural mathematical constant, which is arguably closer to the mathematics arising in number-theoretical attacks. For example, $\pi$ appears in the volume of the sphere, and higher dimensional versions thereof, which in turn is related to the expected number of vectors of a given short length, and so on.

However, using a hash function also has drawbacks. For example, utilizing a hash function, the output is still pseudorandom, so it has similar drawbacks to that of $\pi$ being used. Such drawbacks can include non-optimal computational efficiency and less provable security.

Further, the use of a hash function may have a drawback in that its input may be manipulated to realize a secret attack. To address this, one usually chooses an input that is NUMS itself, such as $\pi$, but the result therefore does not improve the trustworthiness of using $\pi$ directly with regard to freedom from manipulation.

A further drawback for the hash function is that the hash algorithm itself could have been manipulated to realize a secret attack, thereby diminishing trustworthiness.

Searching Parameters

The above pseudorandom approaches to finding a Diffie-Hellman field size, including naïve NUMS and hash-derived pseudorandom approaches, generally require starting from a pseudorandom number value and searching for a small counter value that meets the further criteria. Usually, the criteria works in the following manner. The pseudorandom value and a small value are added to obtain a candidate value p for the Diffie-Hellman field size. If p is not prime, then it is rejected. If p is prime, then it is tested for having a small factor so that p=hq+1 for q is prime, and h is small. If this fails, then p is rejected. If p is rejected, in either case, then the small counter value is incremented by one, and the process is iterated, until a value of p is finally accepted.

As primes are rare, this search may take an undesirable amount of time. One can expect that the search can take on the order of one million iterations. In this regard, the small counter value may be on the order of a million. Further, because conditions on the prime are complex, the resulting small counter value is also complex, and cannot be significantly compressed. Any simple arithmetic operation defining p, must include a simple counter value.

Consequently, the prime p resulting from the search does not have the most compact possible representation. By contrast, pseudo Mersenne prime numbers near to p tend to have much more compact representations.

Choosing p

Based on all of the above, most conventional approaches do not optimize computational efficiency or security. Specifically, the naïve approach is to make additional improvements to further widen the search for the field size. For example, one can search for the den Boer criterion and perhaps some efficiency criterion. However, the main drawbacks of this additional searching is that it may create the suspicion that the search was malicious. A further drawback of this additional searching is that such a search requires more information to specify the field size since the counter seed value will be much larger and the additional conditions are satisfied much more rarely. Further, a large search effort may be required to meet the extra criteria.

Therefore, in accordance with the present disclosure, a classic Diffie-Hellman subgroup size with prime order of one plus a factorial, written in the form (b!+1), is provided. As described below, such prime order allows the Diffie-Hellman key exchange to resist special number field sieves.

In accordance with the embodiments described below, a special structure of the subgroup order also helps to optimize den Boer's reduction between the discrete logarithm and the Diffie-Hellman problem. Thus, the Diffie-Hellman problem is close to the discrete logarithm problem.

Further, by choosing a minimal cofactor for the prime field size, the risk of small subgroup attacks may further be minimized. In some cases, the special structure may even offer computational efficiency advantages over random primes.

Further, in the embodiments described below, the representation of the prime is small enough to fit into a simple equation, which helps dispel concerns that the prime was chosen maliciously, when compared with other primes.

Figure 2:
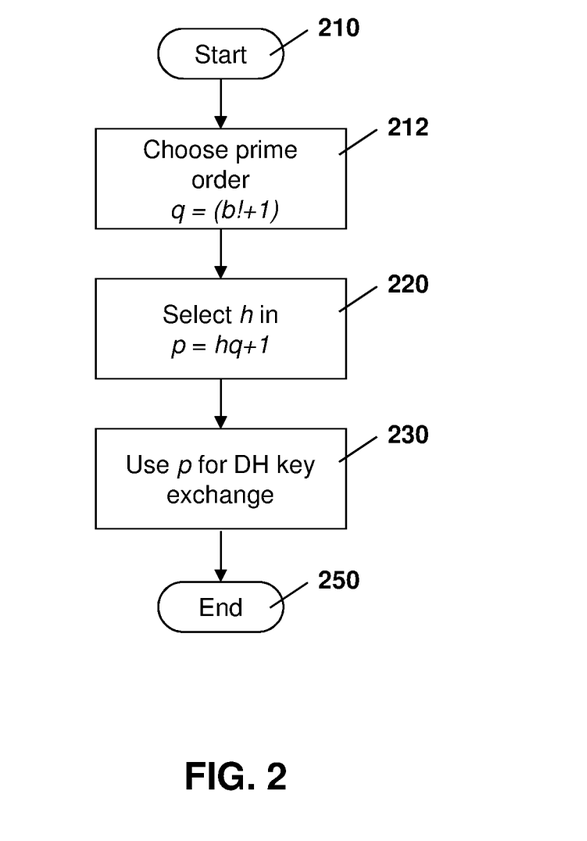
FIG. 2 is a block diagram of one example of selecting and using a field size.

Reference is now made to FIG. 2, which shows a process for the selecting and use of a prime field size p. The process of FIG. 2 yields a field size p=h(b!+1)+1.

In particular, the process starts at block 210 and proceeds to block 212 in which a prime order q for the generator is used. The prime order q is generated using 1 plus a factorial number b. The use of such prime order creates a rare prime order because factorial primes in the form of b!+1 are very rare.

In some embodiments, the choice at block 212 could be made to ensure that q is large enough to provide sufficient cryptographic security for the application without yielding a number that is far too large to be efficiently computed.

As those skilled in the art will appreciate, n! is the product of the first n positive integers. Specifically, n!=1*2*3* . . . *(n−1)*n.

Various options are possible for the choice of bat block 212. For example, b=399, b=427, and b=872 are possibilities for the prime order q since each generate a prime when in the form b!+1.

Typically, applications requiring 128 bit security need a bit length for the field size p to be between 3000 and 4000 bits in order to protect a 128 symmetric key.

The prime (399!+1) has a bit length of 2887, which may be sufficient for some applications but may not be sufficient for applications that require 128 bit security.

The prime (427!+1) has a bit length of 3121 and thus, after it is multiplied by a cofactor, the bit length p exceeds the conventional 3072 bits that is currently used for Diffie-Hellman field size.

Because factorial primes are so rare, the next value of b that could be considered is b=872. The prime (872!+1) has a bit length between 7000 and 8000, which may be large for some applications.

From block 212, the process next proceeds to block 220 in which a cofactor h is found. In particular, when choosing cofactor h, the formula p=hq+1 may be used and should yield a prime. As explained above, in order to avoid small subgroup attacks, cofactor h should be relatively small.

In each case, the cofactor h is found by simply trying each even number h, and computing p=hq+1 and then testing if p is prime. According to prime number theorem, the expected number of values h to try, and thus the size of the first suitable h found, is on the order of a thousand.

If b above is selected to be 427!, then the smallest value of h that yields a prime p is 630. If the b is designated as 872! then the smallest value cofactor is 1398, yielding p=1398 (872!+1)+1.

Therefore, in one embodiment, the selections at blocks 212 and 220 could yield the prime field size p=630 (427!=1)+1.

Others primes p can be considered by replacing 630 with a larger cofactor h, but may in some embodiments be unnecessary. For example, one reason to consider other cofactors is if the original value p with h=630 is somehow vulnerable to special number field sieves. The choice would be made assuming a larger cofactor value is not vulnerable. However, if the original and the larger values of p will be linearly related by a simple relation, this suggests that the special number field sieve would work nearly equally well with both cofactors, and thus there is only a small chance that such slightly increased value of h will prevent special number field sieves vulnerabilities. In other words, for a given q, in one embodiment the smallest value of h that makes a prime may be chosen.

The selection of prime field size p=h(b!+1)+1 solves the issues identified above, namely the key agreement using such field size is resistant to Gordan's attack and the special number field sieve, the correlation of the discrete logarithm problem and the Diffie-Hellman problem is close, the key agreement is resistant to secret algorithms against the discrete logarithm problem, and the key agreement using such field size is further resistant to the threat of small subgroup attacks.

Specifically, the risk of Gordon's attack of hidden vulnerability to special number field sieve is minimized for two reasons. As explained above for Gordon's original countermeasure to his attack, which is the conventional NUMs argument, the attack is prevented because the field size is presentable in a very compressed form. The embodiments of the present disclosure improve the NUMs argument by using greater compression in the form of the small specification of p=h(b!+1)+1.

Further, a general method of expressing factorials as sums of powers would result in a factoring algorithm. For example, to factor n=rs for primes s, let m be an integer near to the square of n, which is easy to find. Then m is between r and s. If m! is written as a sum of powers, then attempting to reduce m! modulo n, can be done, since powers can be reduced efficiently by the square-and-multiply algorithms. Once the greatest common divisor (gcd) of the reduced m! and n is found, the common factor will be the smaller factor of n.

Because factoring is believed to be hard, there should be no general method of re-writing factorials as simple sums of powers. Therefore it is unlikely that a number such as 630(427!+1)+1 could be written as a small sum of powers, which makes it unlikely to be vulnerable to the special number field sieve.

The use of p=h(b!+1)+1 also solves the risk of manipulation to some other secret attacks that affects random primes with low probability. This is due to the very compact form of the equation and means that search information resulting in a search are unlikely to be embeddable into the compact equation. Further, the special properties of b!+1 being prime make it even rarer than its compact representation would suggest, again making it less likely to be vulnerable to the special number field sieve.

There should only be a small gap in difficulty between the Diffie-Hellman problem and the discrete logarithm if Diffie-Hellman schemes are to be considered secure. The field size p=h(b!+1)+1 reduces the risk of a gap between the Diffie-Hellman problem and the discrete logarithm problem because it meets the den Boer condition. Specifically, the number q−1=b! is a product of small numbers, so den Boer's proof applies. Most random primes will never have such a strong proof of a small gap.

In the case of a small cofactor h, the cofactors in the embodiments above are very small compared to q. At most 10 bits of a 3000-bit secret can be leaked, and the cofactor method of resisting the small subgroup attack is relatively cheap, costing less than approximately 1% of run-time.

Further, the above embodiments provide the advantage that, compared to a random prime, the binary expansion of h(b!+1)+1 has a strong pattern of repeated bits in its binary expansion. In particular, if using 630(427!+1)+1, the binary expansion has a sequence of 411 consecutive zero bits. These patterns can lead to slightly faster arithmetic. Specifically, modular reduction can be sped up considerably, because part of the work needed to do reduction mod p is rendered unnecessary due to the repeated bits in p. For example, in Montgomery modular reduction, one of the steps is multiplication by p. If many consecutive bits of p are zero or one, then multiplication by p can be sped up compared to a random p. The speedup may be slight, but nevertheless measurable. Further, unlike other special primes that are sums of powers, faster arithmetic may not reduce the security.

Appendix A shows code used to search for primes in the form described according to the embodiments of the present disclosure.

Referring again to FIG. 2, from block 220 the process proceeds to block 230 in which the field size p is used for the Diffie-Hellman key exchange. The process then proceeds to block 250 and ends.

Figure 3:
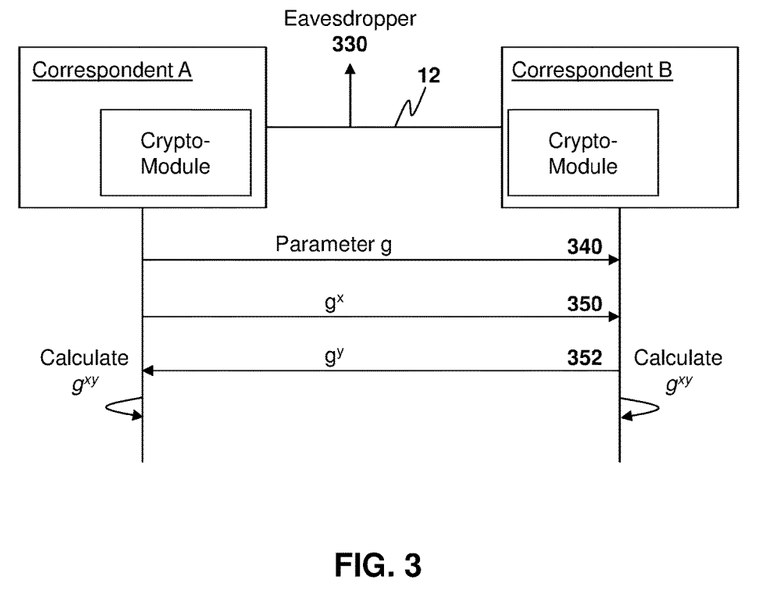
FIG. 3 is a block diagram of an example Diffie Hellman key exchange.

Reference is now made to FIG. 3, which shows a correspondent A and a correspondent B performing a Diffie-Hellman key exchange. An eavesdropper 330 listens to the communications between the two correspondents.

In accordance with the above disclosure, software on the computing devices of correspondent A and correspondent B, will use a field size p. Each may know the prime modulus already, or the prime field size may be exchanged on link 12 between the two correspondents.

Further, the integer g may either be known already at the computing devices of correspondent A or B or may be exchanged, for example as shown in message 340.

Once both parties know g, then correspondent A can create $g^x$ and correspondent B can generate $g^y$, where x and y are private keys of correspondents A and B respectively.

Correspondent A sends $A=g^x$ to correspondent B in message 350 and correspondent B sends $B=g^y$ to correspondent A in message 352. Thereafter, correspondent A can compute $z=b^x=g^{xy}$ and correspondent B can compute $w=A^y=g^{xy}$. Thus, both correspondents A and B will have the shared key that can be used to encrypt and decrypt correspondence between the two parties.

The above may be implemented using any computing device. For example, one simplified computing device is provided with regards to FIG. 4.

Figure 4:
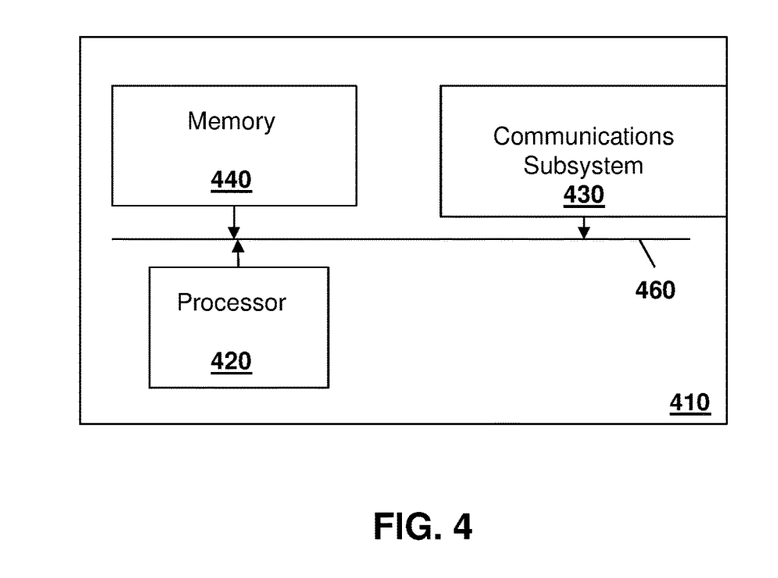
FIG. 4 is a block diagram of a simplified computing device capable of performing the embodiments of the present disclosure.

In FIG. 4, device 410 includes a processor 420 and a communications subsystem 430, where the processor 420 and communications subsystem 430 cooperate to perform the methods of the embodiments described above.

Processor 420 is configured to execute programmable logic, which may be stored, along with data, on device 410, and shown in the example of FIG. 4 as memory 440. Memory 440 can be any tangible, non-transitory computer readable storage medium. The computer readable storage medium may be a tangible or in transitory/non-transitory medium such as optical (e.g., CD, DVD, etc.), magnetic (e.g., tape), flash drive, hard drive, or other memory known in the art.

Alternatively, or in addition to memory 440, device 410 may access data or programmable logic from an external storage medium, for example through communications subsystem 430.

Communications subsystem 430 allows device 410 to communicate with other devices or network elements.

Communications between the various elements of device 410 may be through an internal bus 460 in one embodiment. However, other forms of communication are possible.

The structure, features, accessories, and alternatives of specific embodiments described herein and shown in the Figures are intended to apply generally to all of the teachings of the present disclosure, including to all of the embodiments described and illustrated herein, insofar as they are compatible. In other words, the structure, features, accessories, and alternatives of a specific embodiment are not intended to be limited to only that specific embodiment unless so indicated.

Furthermore, additional features and advantages of the present disclosure will be appreciated by those skilled in the art.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

APPENDIX A

Code used to search for primes

```
# /* shell will compile this:
g++ -o securest_dh.exe -O3 factorial_prime_dh_group_size.cc -lntl
: << C_HERE
*/
# include <NTL/ZZ.h>
using namespace std ;
using namespace NTL ;
ZZ factorial (long b)
{
    ZZ f ;
    long c;
    f = 1;
    for (c=1 ; c<=b ; c++) {
        f *= c;
    }
    return f;
}
void p(long b)
{
    ZZ p,q,two ;
    long h;
    two = 2;
    q = factorial(b) + 1;
    if (ProbPrime(q)) {
        for (h=2; h<1e7; h+=2) {
            cerr << b << "!+1 prime, trying h=" << h << "\r" ;
            p = h*q + 1;
            if (ProbPrime (p)) {
                cout << h << "(" << b << "!+1)+1 is prime!";
                cout << " (bit length " << log(p)/log(two) << ")";
                cout << "              \n";
                break;
            }
        }
    }
}
int main ( )
{
    long b;
    cout << "Looking for prime p=hq+1 (h small) and prime q=b!+1
    ...\n";
    for (b=2 ; b <= 2000; b++) {
        cerr << "Trying b=" << b << "\r";
        p(b);
    }
    return 0;
}
/*
C_HERE
./securest_dh.exe # run it
# */
```

The invention claimed is:

1. A method for a Diffie Hellman key exchange, the method comprising:
   selecting a field size p in the form p=hq+1, where q is a prime number that is one plus a factorial number b, such that q=(b!+1), and h is a cofactor, such that p=hq+1 is prime;
   selecting a generator integer g whose order modulo p is the prime q or is divisible by q;
   choosing a private key x;
   computing a public key gx mod p by raising said generator g to the power of said private key x, using arithmetic modulo said prime field size p;
   sending said public key gx mod p to a correspondent;
   receiving, from the correspondent, a second public key B comprising g raised to a second private key y selected by the correspondent, in the form gy;

creating a key Bx from the received second public key B, by raising said second public key B to the power of said private key x, using arithmetic modulo said prime field size p; and using the key Bx for secure electronic communications with the correspondent.

2. The method of claim 1, wherein b is chosen so the prime order exceeds a minimal threshold size.

3. The method of claim 2, wherein the minimal threshold size is 3000 bits.

4. The method of claim 3, wherein b is selected to be 427.

5. The method of claim 4, Wherein h is selected to be a 630, resulting in p=630(427!+1)+1.

6. The method of claim 3, wherein b is selected to be 872.

7. The method of claim 6, wherein h is selected to be 1398, resulting in p=1398(872!+1)+1.

8. A computing device configured for a Diffie Hellman key exchange, the computing device comprising a processor configured to:

select a field size p in the form p=hq +1, where q is a prime number that is one plus a factorial number b, such that q=(b!+1), and h is a cofactor, such that p=hq +1 is prime;

select a generator integer g whose order modulo p is the prime q or is divisible by q;

choose a private key x;

compute a public key gx mod p by raising said generator g to the power of said private key x, using arithmetic modulo said prime field size p;

send said public key gx mod p to a correspondent;

receive, from the correspondent, a second public key B comprising g raised to a second private key y selected by the correspondent, in the form gy;

create a key Bx from the received second public key B, by raising said second public key B to the power of said private key x, using arithmetic modulo said prime field size p; and using the key Bx for secure electronic communications with the correspondent.

9. The computing device of claim 8, wherein b is chosen so the prime order exceeds a minimal threshold size.

10. The computing device of claim 9, wherein the minimal threshold size is 3000 bits.

11. The computing device of claim 10, wherein b is selected to be 427.

12. The computing device of claim 11, wherein h is selected to be a 630, resulting in p=630(427!+1)+1.

13. The computing device of claim 10, wherein b is selected to be 872.

14. The computing device of claim 13, wherein h is selected to be 1398, resulting in p=1398(872!+1)+1.

15. A computer readable medium comprising program code, that when executed by a processor of a computing device is configured for a Diffie Hellman key exchange, the program code causing the computing device to:

select a field size p in the form p=hq+1, where q is a prime number that is one plus a factorial number b, such that q =(b!+1), and h is a cofactor, such that p=hq+1 is prime;

select a generator integer g Whose order modulo p is the prime q or is divisible by q;

choose a private key x;

compute a public key gx mod p by raising said generator g to the power of said private key x, using arithmetic modulo said prime field size p;

send said public key gx mod p to a correspondent;

receive, from the correspondent, a second public key B comprising g raised to a second private key y selected by the correspondent, in the form gy;

create a key Bx from the received second public key B, by raising said second public key B to the power of said private key x, using arithmetic modulo said prime field size p; and using the key Bx for secure electronic communications with the correspondent.

* * * * *